(12) United States Patent
Chapman et al.

(10) Patent No.: US 8,364,375 B2
(45) Date of Patent: Jan. 29, 2013

(54) TURBOCHARGER FLEET MANAGEMENT SYSTEM

(75) Inventors: Kirby Scott Chapman, Manhattan, KS (US); Sandra Jane Chapman, Manhattan, KS (US); Eric Robert Dufur, Manhattan, KS (US); Eric Ray Figge, Manhattan, KS (US)

(73) Assignee: Scavengetech I, LLC, Manhattan, KS (US)

( * ) Notice: Subject to any disclaimer, the term of this patent is extended or adjusted under 35 U.S.C. 154(b) by 816 days.

(21) Appl. No.: 12/509,170

(22) Filed: Jul. 24, 2009

(65) Prior Publication Data

US 2010/0023369 A1    Jan. 28, 2010

Related U.S. Application Data

(60) Provisional application No. 61/083,440, filed on Jul. 24, 2008.

(51) Int. Cl.
*F02B 37/00* (2006.01)
*F02B 37/007* (2006.01)
(52) U.S. Cl. .................................. 701/100; 123/559.1
(58) Field of Classification Search .................. 701/101, 701/99, 100; 123/559.1; 60/605.1, 611, 60/612, 601, 602; 702/2
See application file for complete search history.

(56) References Cited

U.S. PATENT DOCUMENTS

| | | | |
|---|---|---|---|
| 4,761,993 A * | 8/1988 | Klepacki | 73/114.16 |
| 4,953,110 A * | 8/1990 | Chartrand | 701/101 |
| 5,551,236 A | 9/1996 | Zimmer et al. | |
| 6,134,888 A | 10/2000 | Zimmer et al. | |
| 6,945,047 B2 | 9/2005 | Shea et al. | |
| 6,990,814 B2 | 1/2006 | Boley et al. | |
| 7,296,562 B2 | 11/2007 | Withrow et al. | |
| 2007/0283695 A1* | 12/2007 | Figura | 60/601 |

OTHER PUBLICATIONS

Reicke and M. Kroger, Vibration Analysis in Mechanical and Medical Engineering [online], 2006 [retrieved on Jul. 6, 2012]. Retrieved from the internet:< URL: http://onlinelibrary.Wiley.com/doi/10.1002/pamm.200610144/pdf.*
Chapman, Kirby S., White Paper on the Relationship Between Engine Pressure Differential, Overall Turbocharger Efficiency, and Turbine Inlet Temperature (dated Sep. 29, 2005).
Scavengetech, LLC, Jasper Turbo Upgrade Project, Excess Turbine Flow Calculations and Waste Gate Correlation (provided Feb. 2009).
Scavengetech, LLC, Turbo Charger Management System, TuMS Series 100 (provided Nov. 2008).
Scavengetech, LLC, Digital TuMS (provided Oct. 1, 2007).

* cited by examiner

*Primary Examiner* — Mahmoud Gimie
(74) *Attorney, Agent, or Firm* — Hovey Williams LLP

(57) ABSTRACT

A system of monitoring the performance characteristics of a turbocharged engine and forecasting a performance parameter based on measured data include sensor components for measuring various performance parameters such as pressures and temperatures. The measured data may be received by electronic components that forward the data through networking components to computing components. The data may be stored in a database. Methods for forecasting turbocharger performance and indicating turbocharger malfunctions include retrieving measured data, performing calculations to correct at least a portion of the measured data, retrieving input from a user, performing regression analysis to determine a forecasting model used to forecast future values, and determining a time when the future values reach a user-specified level.

32 Claims, 13 Drawing Sheets

| TIME PERIOD | FIRST COST | SECOND COST WITH OVERHAUL AT LISTED TIME PERIODS | | | | | | | | | |
|---|---|---|---|---|---|---|---|---|---|---|---|
| | | TIME PER. 1 | TIME PER. 2 | TIME PER. 3 | TIME PER. 4 | TIME PER. 5 | TIME PER. 6 | TIME PER. 7 | TIME PER. 8 | TIME PER. 9 | TIME PER. 10 |
| 1 | 1,100 | 1,000 | 1,100 | 1,100 | 1,100 | 1,100 | 1,100 | 1,100 | 1,100 | 1,100 | 1,100 |
| 2 | 2,210 | 2,010 | 2,100 | 2,210 | 2,210 | 2,210 | 2,210 | 2,210 | 2,210 | 2,210 | 2,210 |
| 3 | 3,331 | 3,030 | 3,110 | 3,210 | 3,331 | 3,331 | 3,331 | 3,331 | 3,331 | 3,331 | 3,331 |
| 4 | 4,464 | 4,060 | 4,130 | 4,220 | 4,331 | 4,464 | 4,464 | 4,464 | 4,464 | 4,464 | 4,464 |
| 5 | 5,610 | 5,101 | 5,160 | 5,240 | 5,341 | 5,464 | 5,610 | 5,610 | 5,610 | 5,610 | 5,610 |
| 6 | 6,770 | 6,154 | 6,201 | 6,270 | 6,361 | 6,474 | 6,610 | 6,770 | 6,770 | 6,770 | 6,770 |
| 7 | 7,945 | 7,219 | 7,254 | 7,311 | 7,391 | 7,494 | 7,620 | 7,770 | 7,945 | 7,945 | 7,945 |
| 8 | 9,136 | 8,296 | 8,319 | 8,364 | 8,432 | 8,524 | 8,640 | 8,780 | 8,945 | 9,136 | 9,136 |
| 9 | 10,344 | 9,386 | 9,396 | 9,429 | 9,485 | 9,565 | 9,670 | 9,800 | 9,955 | 10,136 | 10,344 |
| 10 | 11,570 | 10,490 | 10,486 | 10,506 | 10,550 | 10,618 | 10,711 | 10,830 | 10,975 | 11,146 | 11,344 |

FIG. 8

SECOND COST WITH OVERHAUL AT LISTED TIME PERIODS — 80

| TIME PERIOD | TIME PER. 1 | TIME PER. 2 | TIME PER. 3 | TIME PER. 4 | TIME PER. 5 | TIME PER. 6 | TIME PER. 7 | TIME PER. 8 | TIME PER. 9 | TIME PER. 10 |
|---|---|---|---|---|---|---|---|---|---|---|
| 1 | 100 | 0 | 0 | 0 | 0 | 0 | 0 | 0 | 0 | 0 |
| 2 | 200 | 110 | 0 | 0 | 0 | 0 | 0 | 0 | 0 | 0 |
| 3 | 301 | 221 | 121 | 0 | 0 | 0 | 0 | 0 | 0 | 0 |
| 4 | 404 | 334 | 244 | 133 | 0 | 0 | 0 | 0 | 0 | 0 |
| 5 | 509 | 450 | 370 | 269 | 146 | 0 | 0 | 0 | 0 | 0 |
| 6 | 616 | 569 | 500 | 409 | 296 | 160 | 0 | 0 | 0 | 0 |
| 7 | 726 | 691 | 634 | 554 | 451 | 325 | 175 | 0 | 0 | 0 |
| 8 | 840 | 817 | 772 | 704 | 612 | 496 | 356 | 191 | 0 | 0 |
| 9 | 958 | 948 | 915 | 859 | 779 | 674 | 544 | 389 | 208 | 0 |
| 10 | 1,080 | 1,084 | 1,064 | 1,020 | 952 | 859 | 740 | 595 | 424 | 226 |

TURBOCHARGER FLEET MANAGEMENT SYSTEM

RELATED APPLICATION

This application claims the benefit of U.S. Provisional Application Ser. No. 61/083,440, filed Jul. 24, 2008, entitled DIGITAL TURBOCHARGER MONITORING SYSTEM, which is hereby incorporated in its entirety by reference herein.

BACKGROUND

1. Field

Embodiments of the present invention relate to turbocharging of internal combustion engines. More particularly, embodiments of the present invention concern monitoring and forecasting of turbocharged engine performance.

2. Description of the Related Art

Turbochargers are commonly used with internal combustion engines to generally boost the power output and efficiency of the engine. Conventional turbochargers also serve to reduce harmful engine exhaust emissions, such as nitrogen oxide and sulfur emissions, to permit the turbocharged engine to meet emissions requirements. It is also known in the art to monitor certain turbocharger performance parameters, such as pressure and temperature.

Conventional turbocharged engine systems suffer from various limitations. In particular, conventional systems fail to determine when a turbocharger will require maintenance, overhaul, or replacement for continued cost-effective operation and for continued satisfaction of emission requirements. Conventional systems also fail to provide a tool to assess and manage turbocharged engine performance.

SUMMARY OF THE INVENTION

The present invention provides a turbocharger fleet management system that does not suffer from the problems and limitations of the prior art systems set forth above.

A first aspect of the present invention concerns a method to forecast the ability of the turbocharger to achieve a turbocharger air specification according to measured turbocharger performance data including the steps of retrieving a user-specified plurality of ambient temperatures, retrieving a user-specified plurality of future times, determining a forecasted compressor air flow rate for each ambient temperature and future time combination by extrapolating the forecasted compressor air flow rate from the measured turbocharger performance data, and determining whether the turbocharger satisfies the turbocharger air specification at each ambient temperature and future time combination based at least partly on the forecasted compressor air flow rate at each ambient temperature and future time combination.

A second aspect of the present invention concerns a method to indicate a symptom of turbocharger malfunction including the steps of retrieving measured vibration data recorded over time, performing a Fourier transform on the measured vibration data and thereby provide transformed vibration data as a function of vibration frequency, and identifying the symptom of turbocharger malfunction based on the value of the transformed data at a corresponding frequency relative to the operational frequency of the turbocharger.

A third aspect of the present invention concerns a method to determine when to overhaul the turbocharger of a turbocharged engine to reduce engine operating cost including the steps of retrieving a user-specified turbocharger overhaul cost and a user-specified payback period, calculating a plurality of first engine operating costs associated with the turbocharger in a non-overhauled condition for each of a plurality of time periods, calculating a plurality of second engine operating costs each associated with the turbocharger in an overhauled condition for a combination of the plurality of time periods and one of a corresponding plurality of turbocharger overhaul dates on which the turbocharger is overhauled, calculating a savings in operating cost for each time period and overhaul date combination by subtracting the first operating cost from the second operating cost for each overhaul date, and identifying the earliest payback date associated with the operating cost savings being at least as much as the turbocharger overhaul cost, with the payback date being no later than a respective overhaul date plus the payback period.

A fourth aspect of the present invention concerns a method to determine when to service a turbocharged engine due to a flow restriction includes the steps of retrieving measured turbocharger performance data recorded over time, calculating the flow restriction coefficient based on measured turbocharger performance data, performing a regression analysis to determine a forecasting model operable to forecast values of the flow restriction coefficient associated with a plurality of future times, calculating forecasted engine differential pressure values associated with the future times using forecasted values of flow restriction coefficient, and calculating forecasted values of turbocharger minimum required turbine inlet temperature associated with the future times based on forecasted values of engine differential pressure.

A fifth aspect of the present invention concerns a method to determine when to overhaul a turbocharger including the steps of calculating forecasted turbocharger turbine flow rate values associated with a plurality of future times necessary to power a compressor of the turbocharger, calculating forecasted waste gate flow rate values associated with the future times by subtracting forecasted values of turbine flow rate from corresponding forecasted values of turbocharger compressor flow rate, and calculating forecasted waste gate margin values associated with the future times by determining the ratio of forecasted values of waste gate flow rate to corresponding values of forecasted turbine flow rate.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 8 is a chart of costs associated with operating the engine and the turbocharger, with a first group of costs corresponding to a turbocharger in a degraded condition and a second group of costs corresponding to the turbocharger in an overhauled condition;

FIG. 9 is a chart of savings associated with overhauling the turbocharger at a plurality of time periods;

Figure 1:
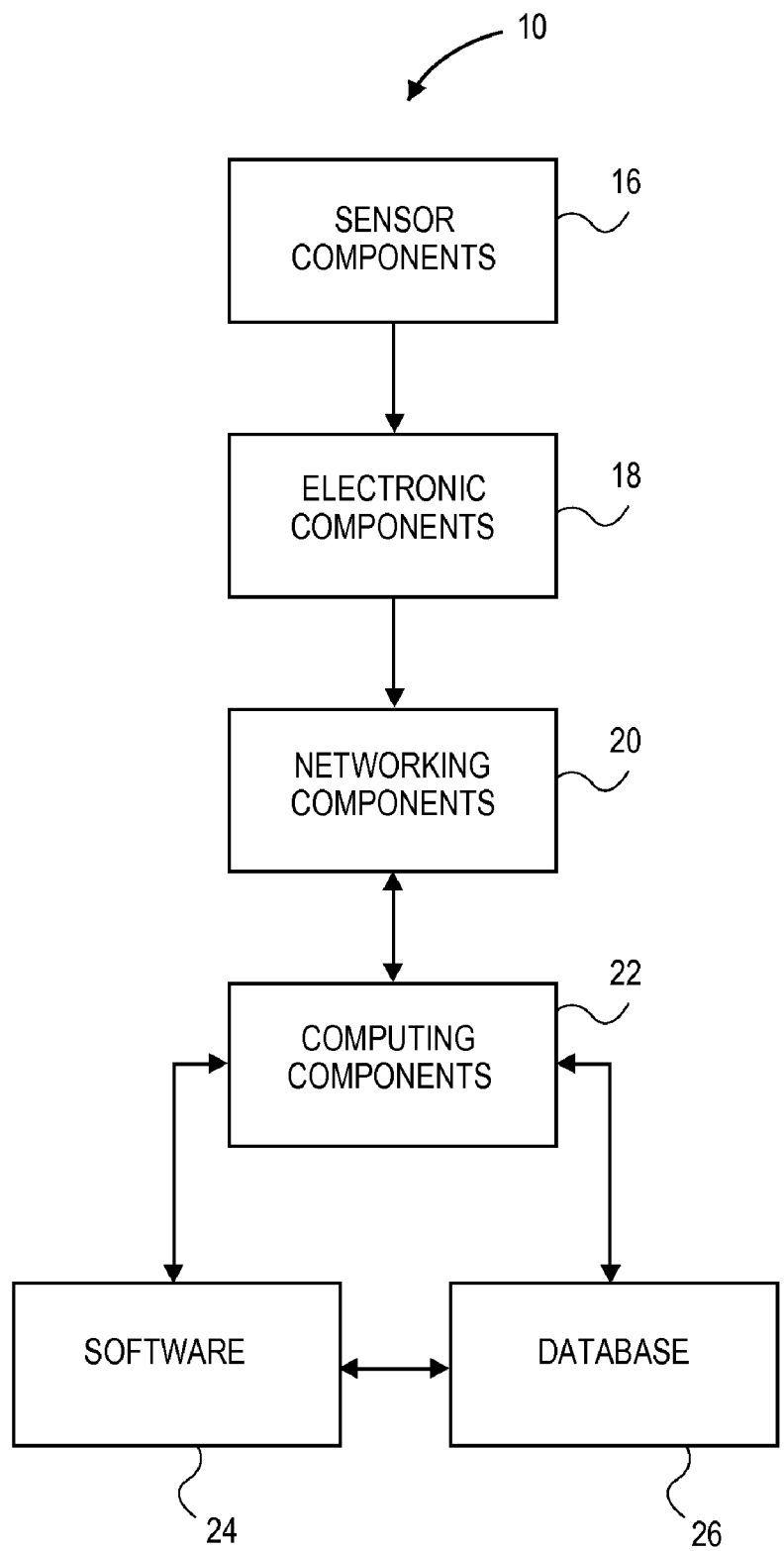
FIG. 1 is a block diagram of a system operable to forecast performance and indicate malfunction of a turbocharged engine and is constructed in accordance with various embodiments of the current invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Turning initially to FIG. 1, a turbocharger management system 10 is operable to monitor the performance characteristics of a turbocharged engine 12 and to forecast turbocharged engine 12 performance based on measured data and is constructed in accordance with various embodiments of the present invention. The system 10 also preferably serves as a management tool to determine when turbocharger maintenance, overhaul, or replacement should occur. The illustrated system 10 is preferably used with a stationary turbocharged engine 12 installed at a natural gas pipeline compressor station site (not shown). However, the principles of the present invention are equally applicable where system 10 is installed on a stationary turbocharged engine installed at another type or site. Furthermore, the system 10 could also be installed in other turbocharged engine 12 applications (e.g., for turbocharged engines that serve as motive power in a marine vessel or locomotive vehicle). Yet further, the illustrated system 10 can also be used to manage a plurality of turbocharged engine 12 installations. The system 10 broadly includes sensor components 16, electronic components 18, networking components 20, computing components 22, software 24, and a database 26, as described in more detail below.

Figure 2:
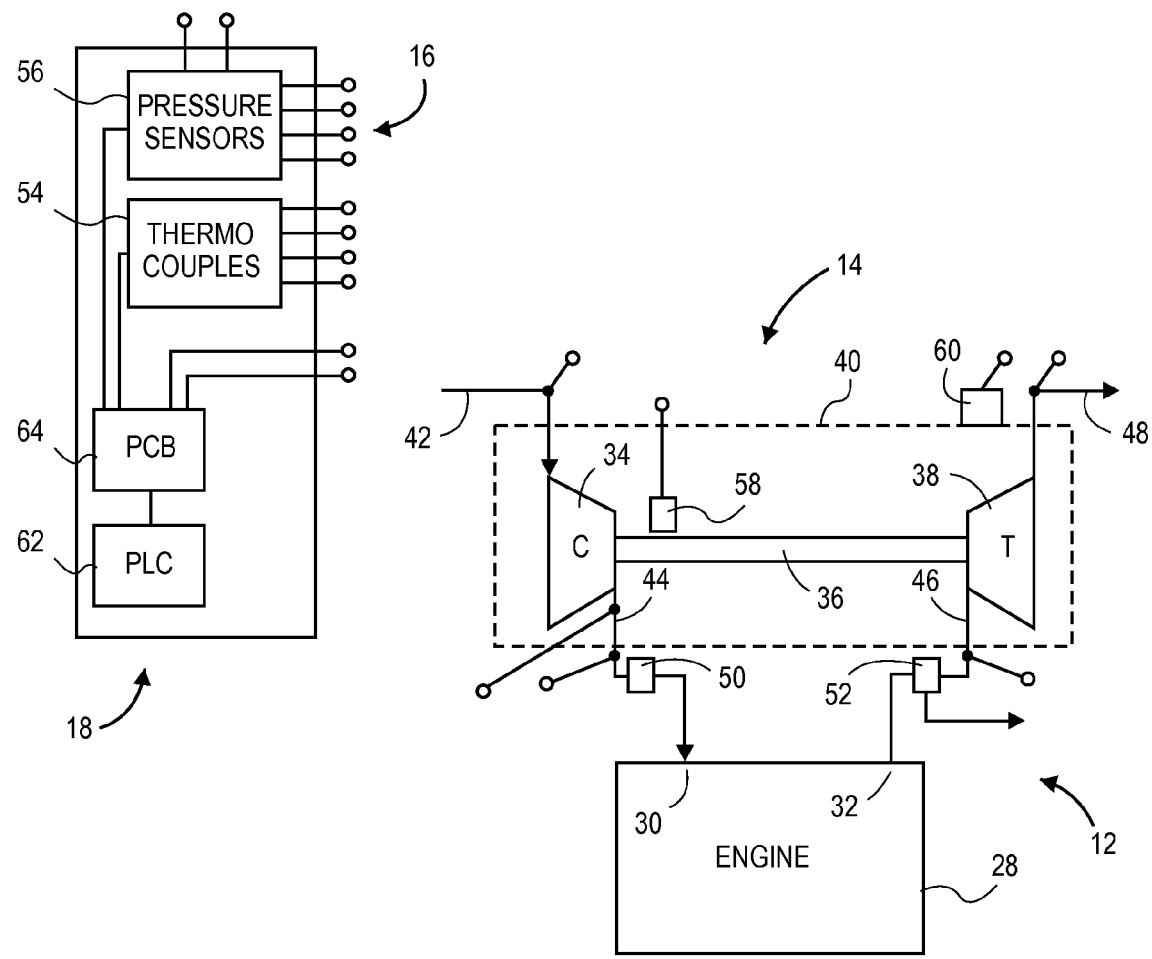
FIG. 2 is a fragmentary schematic view of the system shown in FIG. 1, showing the system operably coupled to a turbocharged engine.

Generally, the turbocharged engine 12 broadly includes a turbocharger 14 operably coupled to an internal combustion engine 28, as shown in FIG. 2. In the usual manner, the internal combustion engine 28 includes an air inlet 30 and an exhaust outlet 32. The turbocharger 14 includes a compressor 34 and a turbine 38 drivingly connected by a shaft 36, all of which are enclosed in a case 40, with the turbocharger 14 also presenting a compressor inlet 42 and outlet 44 and a turbine inlet 46 and outlet 48. As is commonly known, the turbine inlet 46 is fluidly connected to the engine outlet 32 so that the turbine 38 is rotated by exhaust flow from the exhaust outlet 32 of the engine 28. Again, the compressor 34 is drivingly connected to the turbine 38 through the shaft 36 such that rotation of the turbine 38 causes rotation of the compressor 34. The compressor outlet 44 is fluidly connected to the air inlet 30 of the internal combustion engine 28 so that the rotating compressor 34 provides compressed induction air flow to the air inlet 30 of the engine 28 to be used during combustion.

The illustrated turbocharged engine 12 also preferably includes an aftercooler 50 and a waste gate 52. In the usual manner, the aftercooler 50 is fluidly connected between the compressor outlet 44 and the air inlet 30 of engine 28 to increase the density of induction air flow into the air inlet 30 of the engine 28. The waste gate 52 is fluidly connected between the exhaust outlet 32 of the engine 28 and the turbine inlet of turbine 38 and serves to selectively control the amount of exhaust flow into the turbine 38 by selectively venting exhaust flow to ambient. However, for some aspects of the present invention, the turbocharged engine 12 may not include the aftercooler 50 or waste gate 52.

The sensor components 16 generally retrieve data from the turbocharged engine 12 and preferably include thermocouple assembly 54, pressure sensor assembly 56, speed sensor 58, and accelerometer 60. Thermocouple assembly 54 includes thermocouples that are each operably coupled to a corresponding one of the compressor inlet 42 and outlet 44 and turbine inlet 46 and outlet 48 to sense temperature of corresponding gas flows into and out of the compressor 34 and turbine 38. Similarly, pressure sensor assembly 56 includes pressure sensors that are each operably coupled to a corresponding one of the compressor inlet 42 and outlet 44 and turbine inlet 46 and outlet 48 to sense static pressure of corresponding gas flows into and out of the compressor 34 and turbine 38. As shown in FIG. 2, the locations on the turbocharged engine 12 for operably coupling both thermocouples of the thermocouple assembly 54 and pressure sensors of the pressure sensor assembly 56 are shown as open circles, wherein sensor components 16 are connected. The pressure sensor assembly 56 also preferably includes a barometric pressure sensor to measure ambient pressure and a differential pressure sensor. The differential pressure sensor is operably coupled adjacent to the compressor outlet 44 to sense the mass air flow rate of induction air flow into the engine 28. But it is also within the scope of the present invention where the sensor is installed at another location to measure mass flow, such as between the compressor outlet 44 and the air inlet 30. However, it is also within the scope of the present invention where another type of mass air flow sensor is used to measure mass flow rate of induction air. Speed sensor 58, such as a magnetic pickup, is mounted on the turbocharger 14 and is operably coupled to the shaft 36 to sense turbocharger 14 rotational velocity. The accelerometer 60 is mounted on the turbocharger 14 to sense turbocharger 14 vibration. It is also within the ambit of the present invention where sensor components 16 include an alternative combination of sensors to monitor turbocharged engine conditions. The sensor components 16 may be installed or fitted to various locations, such as the turbocharger case 40, the shaft 36, inlet ports, outlet ports, and the interior or exterior of chambers, on both the compressor 34 and the turbine 38. The sensor components 16 may connect directly to the electronic components 18 through wiring, cabling, tubing, or the like.

The electronic components 18 generally convert raw measurements from the sensor components 16 into data that can be utilized by the computing components 22 and the software 24. For example, the electronic components 18 may receive voltages and currents from the sensor components 16 and may convert these quantities into values that include temperature, pressure, flow rate, vibration velocity, rotational speeds, etc. Thus, the electronic components 18 include a programmable logic controller (PLC) 62, that preferably includes enhanced communication abilities (e.g. to communicate with other PLCs 62), and a signal converting component such as an analog-to-digital converter (ADC). The advanced PLC 62 more preferably includes a SNAP-PAC-S1 programmable automation controller manufactured by Opto 22 of Temecula, Calif., but the PLC 62 could comprise another PLC 62 or another controller without departing from the scope of the present invention. The electronic components 18 may also include digital signal controllers, such as the dsPIC30F3014/4013 manufactured by Microchip Technology, Incorporated of Chandler, Ariz. However, the electronic components 18 could also include other signal processing components and/or data processing components without departing from the scope of the present invention. The electronic components 18 are preferably mounted on a printed circuit board (PCB) 64 within an enclosure that preferably meets Class I, Division 2 requirements of the National Electric Code, Article 500. The illustrated electronic components 18 and enclosure are preferably located adjacent the turbocharged engine 12.

In various embodiments, the sensor components 16 may include some of the capabilities attributed to the electronic components 18, such that the sensor components 16 may forward already converted values of temperature, pressure, flow rate, and the like to the electronic components 18. In other embodiments, some sensor components 16 may convert values while other sensor components 16 may not.

The electronic components 18 may transmit data collected from the sensor components 16 and may connect to or communicate with the networking components 20 electrically through hard-wired cabling such as coaxial or twisted pair, optically through optical fibers, wirelessly using radio-frequency (RF) components, combinations thereof, or the like. The electronic components 18 may utilize any of a variety of known protocols, such as Ethernet.

The networking components 20 generally transport measured data from the electronic components 18 to the computing components 22 and may include general computing network structures such as WANs, LANs, MANs or CAN-BUS, or specific networks, such as the Internet. The networking components 20 may include a plurality of individual networks. The networking components 20 may utilize a variety of network implementations such as electrical, optical, wireless such as WiFi™, combinations thereof, and the like. The networking components 20 may also utilize any of a variety of known protocols.

The computing components 22 generally perform at least a portion of the steps of the methods of various embodiments of the invention, as will be discussed in greater detail, and preferably receive data to be used in the methods from the networking components 20. The computing components 22 may execute instructions or commands that are included in the software 24 and may be configured to perform arithmetic operations, logical operations, other operations, and combinations thereof.

The computing components 22 preferably include a computer installed at the compressor station site to provide performance data (including real-time data) to an on-site user concerning the turbocharged engine, and another computer installed at another location (such as an off-site central location) to provide performance data to another user. However, it is also within the scope of the present invention where the computing components 22 include multiple on-site computers and/or multiple off-site computers to provide sufficient access to performance data. Furthermore, the computing components 22 may include mainframes, workstations, desktop computers, laptop computers, notebook computers, and the like. The computing components 22 may further include microprocessors, microcontrollers, field-programmable gate arrays (FPGAs), digital signal processors (DSPs), programmable logic devices (PLDs), application specific integrated circuits (ASICs), combinations thereof, and the like. In addition, the computing components 22 may include data storage elements such as random access memory (RAM), read-only memory (ROM), programmable ROM (PROM), erasable PROM (EPROM), cache memory, flash drives, flash memory cards, portable computer diskettes, floppy disks, hard disks, hard disk drives, optical disks, compact disks (CDs), digital video discs (DVDs), Blu-ray Discs, combinations thereof, and the like. The data storage elements may be considered computer-readable media, wherein data may be stored to or retrieved from any of the listed elements by the computing components 22.

The software 24 generally includes a plurality of instructions that are executed to perform at least a portion of the steps of the methods of various embodiments of the invention. The instructions may also exist as a plurality of code segments to be executed by the computing components 22, but the instructions could also be executed by other components of the system 10, such as the electronic component 18. The code segments may be grouped or combined to form a computer program. In various embodiments, the computer program may be created from source code using a variety of computer programming languages. The source code may be compiled, translated, interpreted, or the like as is known in the art. The software 24, including the source code as well as the instructions and code segments derived therefrom, may be stored to and retrieved from the computer-readable media. Furthermore, the software 24 may include the database 26 which stores data retrieved from one or more electronic components 18.

In various embodiments, such as the illustrated embodiment, the system 10 includes a plurality of sensor components 16 and a plurality of electronic components 18 that monitor one or more turbocharged engines. The data collected from these turbocharged engines, such as turbocharged engine 12, may be received through the networking components 20 in a central location to be stored in the database 26 and be analyzed by the computing components 22. Analyzed results, as discussed in greater detail below, may be shared with computing components 22 and users in other locations, such as the compressor station site. In general, a user of the system 10 is a manager or owner of the one or more turbocharged engines which the system 10 is monitoring. In other embodiments, the data collected from one or more turbocharged engines may be received through the networking components 20 in a plurality of locations, wherein a plurality of databases 26 may be created. The computing components 22 may analyze the data from one or more databases 26 and may share data or analyzed results with other computing components 22.

The illustrated system 10 preferably collects and validates data from the turbocharger 14. The sensors from the sensor components 16 may measure various quantities from the compressor 34 and the turbine 38, which are forwarded to the electronic components 18. The measured data may be sent via the networking components 20 to the computing components 22 to be analyzed by the software 24. In various embodiments, the sensor components 16 may measure the compressor 34 inlet and outlet static pressures and temperatures, the turbine 38 inlet and outlet static pressures and temperatures, the turbocharger 14 speed, and the compressor 34 mass air flow rate. This measured data may be added to the database 26 and then validated using at least two techniques. The first technique may include ensuring that the first law of thermodynamics energy balance around the turbocharger 14 is within a user-defined tolerance. The second technique may include ensuring that the average of the data, the standard deviation, and the coefficient of variance are within user-defined tolerances. Data that falls within the tolerances may be marked as valid. Otherwise, the data may be marked as invalid.

The system 10 also preferably identifies the time-zero values (i.e., values associated with initial turbocharger operation) for a plurality of parameters through the following steps. The date may be recorded in the database 26 of when the new turbocharger 14 was installed on the engine 28. As time goes by, the first 2,500 data measurements are preferably collected, although a larger or smaller sample size could be used. The measurements are analyzed to determine the maximum turbocharger 14 operating speed. The data that falls within ten percent of the maximum turbocharger 14 operating speed may be corrected as discussed in more detail below. From the corrected data, the time-zero values may be calculated for the compressor 34 efficiency, the turbine 38 efficiency, the vibration levels of the turbocharger 14, and the engine discharge coefficient, among others. The time-zero values may be stored in the database 26 for use in calculations discussed below. However, for some aspects of the present invention, the system 10 could operate without determining the time-zero values.

Once the validity of the data has been determined, the system 10 may perform a number of calculations for the compressor 34, using the data marked as valid. After the calculations are complete, the results may be stored in the database 26. The values calculated may include the air molecular weight based on the relative humidity; the compressor 34 inlet specific heat and ratio of specific heats at static conditions; the compressor 34 outlet specific heat and ratio of specific heats at static conditions; the average compressor 34 specific heats from inlet and outlet static conditions; the compressor 34 inlet and outlet specific volume, air velocity, and Mach numbers; the stagnation pressure and stagnation temperature at the compressor 34 inlet and outlet; the specific heat, the ratio of specific heats, and the air density at stagnation conditions; the total-total, the total-static, the static-total, and the static-static compressor 34 pressure ratios; the average specific heat and the ratio of specific heats at compressor 34 inlet and outlet stagnation conditions; the compressor blade tip velocity, the total temperature ratio, and the speed of sound based on static compressor inlet temperatures; the gas kinetic energy at the compressor 34 inlet and outlet conditions; and the stagnation enthalpy change across the compressor 34, based on the outlet minus the inlet: $\Delta H_{0,comp}$.

The system 10 may also perform a number of calculations for the turbine 38 using valid data. After the calculations are complete, the results may be stored in the database 26. The values calculated may include the turbine 38 inlet specific heat and ratio of specific heats at static conditions; the turbine 38 outlet specific heat and ratio of specific heats at static conditions; the average turbine 38 specific heat and the specific heat ratio from inlet and outlet conditions; the turbine 38 inlet and outlet specific volumes and the gas velocity; the stagnation pressure and temperature at the turbine 38 inlet and outlet; the specific heat and the ratio of specific heats at stagnation conditions; the total-total, the total-static, the static-total, and the static-static turbine 38 pressure ratios; the average specific heat and the ratio of specific heats at turbine 38 inlet and outlet stagnation conditions; the gas kinetic energy at the turbine 38 inlet and outlet conditions; and the stagnation enthalpy change across the turbine 38 based on the outlet minus the inlet: $\Delta H_{0,turb}$.

The system 10 may further perform calculations for the power and efficiency of the turbocharger 14. After the calculations are complete, the results may be stored in the database 26. At least a portion of the calculations may utilize data that is gathered from testing the performance of a plurality of turbochargers. In some instances, the test data may be associated with a particular model of turbocharger. The values calculated may include the total oil enthalpy change based on turbocharger test data; the cooling water total enthalpy change based on turbocharger test data; the heat transfer from the turbocharger 14 based on the first law of thermodynamics energy balance, $Q_{total}$; the percentage heat transfer loss: $Q_{loss}=Q_{total}/\Delta H_{0,turb}$; the compressor 34 power from the first law of thermodynamics: $W_{comp}=-\Delta H_{0,comp}$; the turbine 38 power from first law of thermodynamics: $W_{turb}=-W_{comp}\cdot F_{loss}$, where $F_{loss}$ is determined from test data; the isentropic compressor 34 work: the total-total, the total-static, the static-total, and the static-static; the compressor 34 isentropic efficiency: the total-total, the total-static, the static-total, and the static-static; the isentropic turbine 38 work: the total-total, the total-static, the static-total, and the static-static; and the turbine 38 isentropic efficiency: the total-total, the total-static, the static-total, and the static-static.

The system 10 may further perform calculations for correcting the compressor 34 data from actual to specified conditions. After the calculations are complete, the results may be stored in the database 26. At least a portion of the correction calculations are preferably based on the American Society of Mechanical Engineers (ASME) Power Test Code reference: PTC 10-1997 Performance Test Code on Compressors and Exhausters, published 1997, re-affirmed 2009, ISBN: 0791824500, which is hereby incorporated by reference into this document in its entirety. However, the principles of the present invention are equally applicable where other calculations are used to correct the compressor data to specified conditions. The values calculated may include the compressor 34 polytropic factor and the polytropic efficiency based on stagnation conditions; the compressor 34 flow coefficient based on stagnation density; the compressor 34 polytropic work coefficient, $\mu_p$, based on stagnation conditions; the compressor 34 volume ratio based on stagnation $PR_{tt}/TR_{tt}$; the compressor 34 machine Mach number based on stagnation conditions and blade tip velocity; the compressor 34 machine Reynolds number based on stagnation conditions and impeller exit geometry; the compressor 34 inlet specific heat, the ratio of specific heats and the density at user-specified inlet temperature and pressure and compressor 34 rotating speed; the compressor 34 inlet velocity at the user-specified inlet temperature and pressure and compressor 34 rotating speed; the compressor 34 inlet stagnation temperature and pressure at user-specified inlet temperature and pressure and compressor 34 rotating speed; the stagnation specific heat, the ratio of specific heats, and the density at user-specified inlet temperature and pressure and compressor 34 rotating speed; the compressor 34 air flow rate at user-specified inlet temperature and pressure and compressor 34 rotating speed; the compressor 34 machine Mach number, the machine Reynolds number, and the compressor 34 blade tip velocity at stagnation conditions; the compressor 34 Reynolds number corrections based on ASME PTC-10, $R_{C,sp}$, $R_{A,sp}$, $R_C$, $R_A$, $R_B$; the polytropic efficiency based on Reynolds number corrections at user-specified inlet temperature and pressure and compressor 34 rotating speed; the corrected Reynolds number, $Re_{corr}$, based on specified and actual polytropic efficiencies; the outlet stagnation temperature at specified conditions based on polytropic efficiency at specified conditions; the compressor 34 outlet specific heat and specific heat ratios at specified conditions; the compressor 34 average specific heat and specific heat ratio at specified conditions; the polytropic coefficient and temperature ratio based on average specific heat ratio; the compressor 34 outlet stagnation and static pressure, the temperature, the specific heat, and the specific heat ratios at specified conditions; the compressor 34 pressure ratio at specified conditions; and the compressor 34 power, the isentropic power, and the isentropic efficiency at specified conditions.

In various embodiments, after the above-listed calculations are complete, several regression analysis calculations may be performed to develop forecasting models that are used to generate reports or forecast future performance, as discussed below. In other embodiments, the regression analysis calculations may be performed individually as needed.

The actual measured data for the performance of the turbine 38 may be retrieved from the database 26. The actual measured data and the corrected data for the performance of the compressor 34 may be retrieved from the database 26. In addition, data on the engine 28 differential pressure, the engine inlet 30 temperature, and the engine inlet 30 pressure may be retrieved. Vibration data are preferably retrieved at vibration magnitudes at about 0.5×, 1.0×, 2.0×, and 3.0× and 4.0× the turbocharger rotational velocity, but could also be retrieved at other multiples of turbocharger rotational velocity for some aspects of the present invention. In some instances, the measured data retrieved may include measurements taken since the turbocharger 14 was last serviced, repaired, or overhauled.

Using regression analysis techniques on the data retrieved, forecasting models may be developed for the compressor 34 efficiency, the turbine 38 efficiency, the engine 28 discharge coefficient, and vibration magnitudes, among others. Based on prior analysis of similar data or a plot of current data, a model may be chosen that best fits the data for a given parameter. For example, the compressor 34 efficiency may require one model while the turbine 38 efficiency may require a different model. In some embodiments, an exponential model or a logarithmic model may be utilized. An exemplary equation for the exponential model is shown below as EQ. 1:

$$X(t)=X(0) \cdot B \cdot \exp(A \cdot \text{DeltaTime}) \quad \text{EQ. 1}$$

where X(t) is the value of the parameter at a given future time t after a period of time "DeltaTime" has elapsed, X(0) is the initial value of the parameter, A and B are constants determined from the measured and/or corrected data, and exp is the exponential function. It is also within the ambit of the present invention a linear model or another non-linear model is used. In general, any model that appropriately fits the data or is known to provide reliable forecasting may be used. Once a forecasting model has been chosen, the retrieved data may be analyzed in order to provide values for the coefficients that are included in the model. With the values of the coefficients determined, the model is generally ready to be used to forecast future values of the parameter for which the model was developed. In various embodiments, the equation used with a given model, for example EQ. 1, may be solved for DeltaTime to forecast a future time at which the parameter, X(t), will possess a given (perhaps user-specified) value.

Over time, the performance of the turbocharged engine 12 can degrade (e.g., due to the buildup of deposits within the turbocharger 14, engine 28, or aftercooler 50 that reduce airflow provided by the turbocharger 14). As airflow is reduced through the turbocharger 14, and in turn through the engine 28, emissions from the engine 28 may increase. These emissions may include nitrogen oxides, also known as $NO_x$. It is possible that after a certain period of time, the turbocharger 14 may not be able to move enough air through the engine 28 at a given ambient temperature to meet an emissions requirement. Thus, regression analysis techniques may be used to forecast the ability of the turbocharger 14 to move a sufficient amount of air through the engine 28 to comply with an emissions requirement.

Figure 3:
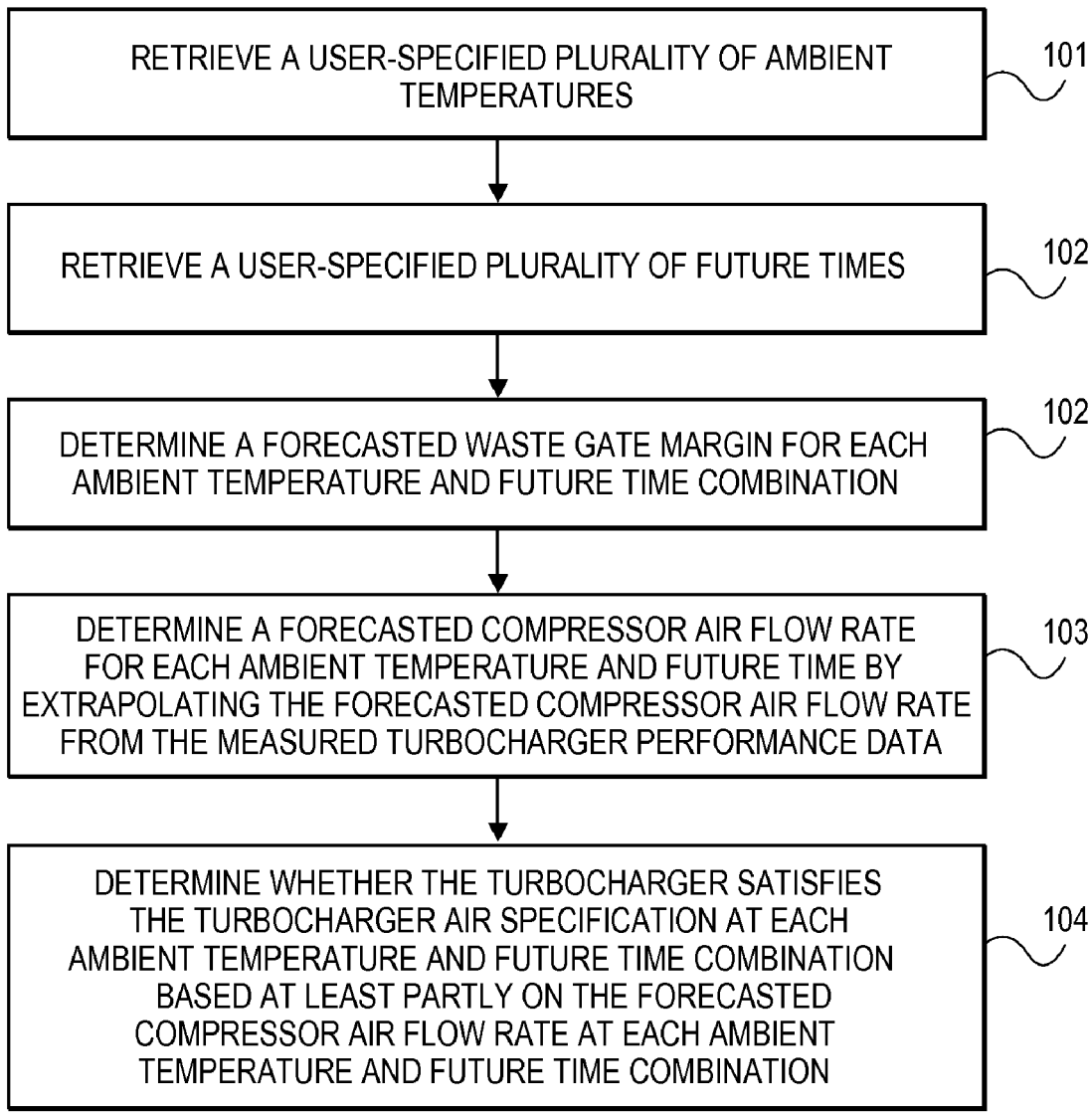
FIG. 3 is a flow diagram of at least a portion of the steps of a method to forecast performance of the turbocharged engine.

At least some of the steps of a method 100 for forecasting turbocharger 14 emission compliance are listed in FIG. 3. The steps may be performed in the order as shown in FIG. 3, or they may be performed in a different order. Furthermore, some steps may be performed concurrently as opposed to sequentially. In various embodiments, the steps may correspond to one or more code segments to be executed by the computing components 22.

In connection with step 101, a user may supply a plurality of ambient temperatures for which he desires the performance of the turbocharger 14 to be analyzed. The temperatures are generally the ambient or environmental temperatures in which the turbocharger will operate over a given period of time. For example, if the turbocharger 14 is located in the southeastern United States and the user is interested in analyzing the performance of the turbocharger 14 during the summer months, then the user may supply an appropriate range of temperatures, such as 50 degrees to 100 degrees in 10-degree increments. Alternatively, a user in a cooler climate or a user desiring analysis for winter months may provide a temperature range with smaller values, such as zero degrees to 60 degrees in 10-degree increments.

In connection with step 102, the user may supply a plurality of future times over which to analyze the performance of the turbocharger 14. The user may specify a plurality of days, weeks, or months. For example, the user may want to analyze the performance of the turbocharger 14 over the next 30 days, 10 weeks, 6 months, or the like.

A forecasted waste gate margin value may be calculated for every combination of ambient temperature and future time. As will be discussed in greater detail in method steps 501, 502, and 503 below, the calculation of forecasted waste gate margin is preferably performed utilizing a forecasting model that was developed from measured turbocharger 14 performance data. The waste gate margin may be calculated for the first temperature and the first future time, the first temperature and the second future time, and so forth for all the future times. Likewise, the waste gate margin value is determined for the other temperatures and future times in a similar fashion.

In connection with step 103, a compressor 34 air flow rate value is calculated for every combination of ambient temperature and future time, similar to step 102. For example, the compressor 34 air flow rate may be calculated for the first temperature and the first future time, the first temperature and the second future time, and so forth for all the future times. Likewise, the compressor 34 air flow rate value is determined for the other temperatures and future times in a similar fashion. The calculation of the compressor 34 air flow rate may be performed using a forecasting model that was created with measured turbocharger performance data.

In connection with step 104, it is determined whether the turbocharger 14 may satisfy an air flow specification that achieves overall engine performance criteria (e.g., preferably a specific emission requirement such as a predetermined level of nitrogen oxide or carbon monoxide emissions) at each ambient temperature and future time combination based on the values of the waste gate margin and the compressor 34 air flow rate at each ambient temperature and future time combination. In other words, the emission requirement is preferably based at least partly on a minimum compressor 34 air flow rate and compressor outlet pressure. However, it is also within the ambit of the present invention where another performance requirement of the turbocharged engine is used to determine whether the turbocharger 14 is satisfying the emissions standard. Preferably, if at any temperature and future time combination the forecasted compressor 34 air flow rate is below the minimum value, then the emissions requirement would not be satisfied. For every temperature and future time combination that the compressor 34 air flow rate is above the minimum required value, the forecasted waste gate margin value is calculated. If the waste gate margin value is above approximately 5%, then the turbocharger 14 preferably satisfies the emissions requirement. If the waste gate margin value ranges from approximately 1% to approximately 5%, then the turbocharger 14 may be determined as being in a condition proximal to the emission requirement where the emissions standard may not be met. In such a case, the turbocharger 14 may meet the emissions standard at some times and may not meet the emissions standard at other times. If the waste gate margin value is below approximately 1%, then the turbocharger 14 preferably does not satisfy the air specification that is directly related to the emissions requirement. It is also within the scope of the present invention where another engine performance criteria is determined to be satisfied by meeting the air flow specification, such as combustion stability or engine efficiency.

Figure 4:
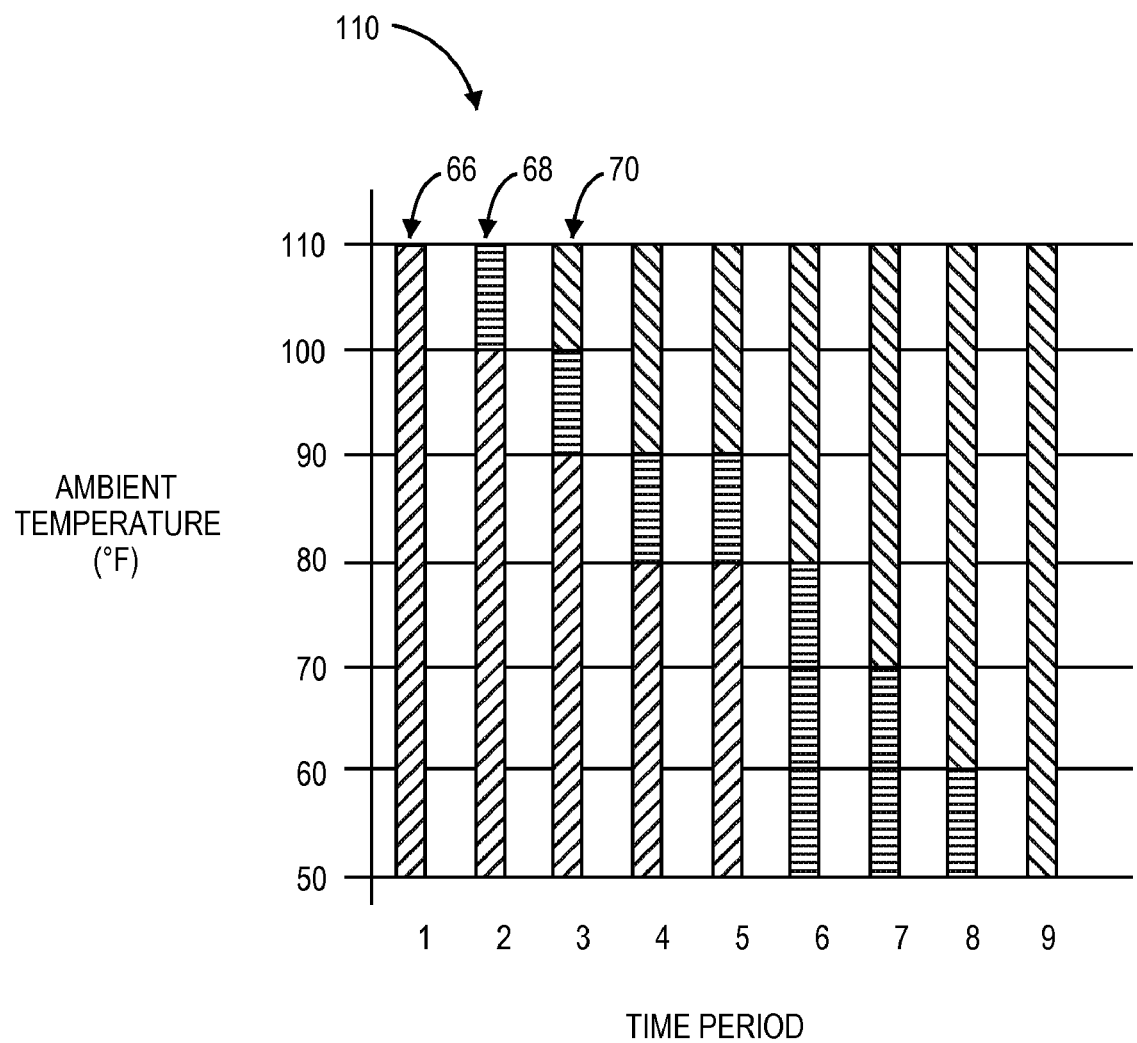
FIG. 4 is a chart of the forecasted performance of the turbocharger over time for various ambient temperatures determined according to the forecasting method shown in FIG. 3.

A report or chart 110 may be created from the forecasted data, as shown in FIG. 4. The chart 110 may include the user-specified range of ambient temperatures along the vertical axis, and the user-specified future times along the horizontal axis. For each temperature and future time combination, the chart 110 may be assigned an indicia based on whether the turbocharger 14 is determined as satisfying the air specification that is directly related to the emissions requirement. For example, for the temperature and future time combinations in which the turbocharger 14 is determined as satisfying the air specification that is directly related to the emissions requirement, the chart 110 may be assigned a first indicia 66, such as the color green. For the temperature and future time combinations in which the turbocharger 14 may be in a condition proximal to the air specification that satisfies the emissions requirement, the chart 110 may be assigned a second indicia 68, such as the color yellow. For the temperature and future time combinations in which the turbocharger 14 is determined as not satisfying the air specification that achieves the emissions requirement, the chart 110 may be assigned a third indicia 70, such as the color red.

Figure 5:
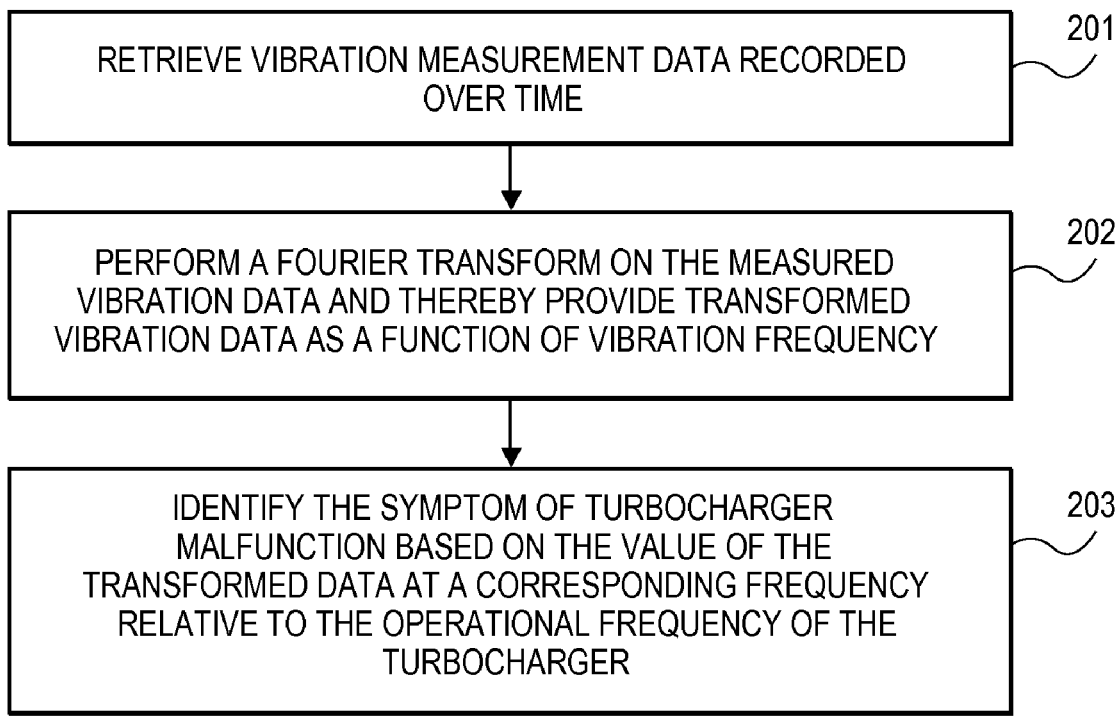
FIG. 5 is a flow diagram of at least a portion of the steps of a method to identify a symptom of turbocharger malfunction based upon measured turbocharger vibration data.

At least a portion of the steps of a method 200 for indicating a symptom of turbocharger 14 malfunction is listed in FIG. 5. The steps may be performed in the order as shown in FIG. 5, or they may be performed in a different order. Furthermore, some steps may be performed concurrently as opposed to sequentially. In various embodiments, the steps may correspond to one or more code segments to be executed by the computing components 22.

In connection with step 201, vibration measurement data recorded over time is retrieved. The data may be given in units of Gs (the acceleration due to gravity) and may be recorded by a sensor component 16, such as an accelerometer, that is located on the turbocharger case 40. In connection with step 202, a Fourier transform is performed on the vibration measurement data. The Fourier transform may include the discrete Fourier transform, the fast Fourier transform, or other operations that transform time-sampled data into frequency-domain data. Thus, the transformed data may represent the magnitude of vibration for a plurality of frequencies.

In connection with step 203, a symptom of turbocharger 14 malfunction is identified based on the value of the transformed data at specific frequencies related to the operational frequency of the turbocharger 14. The operational frequency (i.e., rotational frequency) of the turbocharger 14 comprises the rotational speed of the shaft 36 of the turbocharger 14. For example, the rotational speed of the shaft 36 may be given in terms of rotations per minute (rpm) (i.e., cycles per minute (cpm)). An exemplary operational frequency of a turbocharger may be 13,800 cpm. Analysis of the transformed data at certain frequencies may indicate various mechanical malfunction issues. Preferably, if the value of the transformed data at frequencies ranging from about 0.46 to about 0.51 times the operational frequency is above a user-specified level for excessive vibration, then a turbocharger 14 bearing malfunction, such as a problem with oil whirl in the turbocharger 14, is indicated. If the value of the transformed data at approximately the operational frequency is above a user-specified level for excessive vibration, then a turbocharger 14 rotational imbalance problem is indicated (e.g., where dust-laden films are located on one or more surfaces of the compressor impeller). If the value of the transformed data at frequencies ranging from about two to about four times the operational frequency is above a user-specified level for excessive vibration, then a turbocharger mechanical malfunction, such as a problem with the shaft 36 of the turbocharger 14, is indicated.

Figure 6:
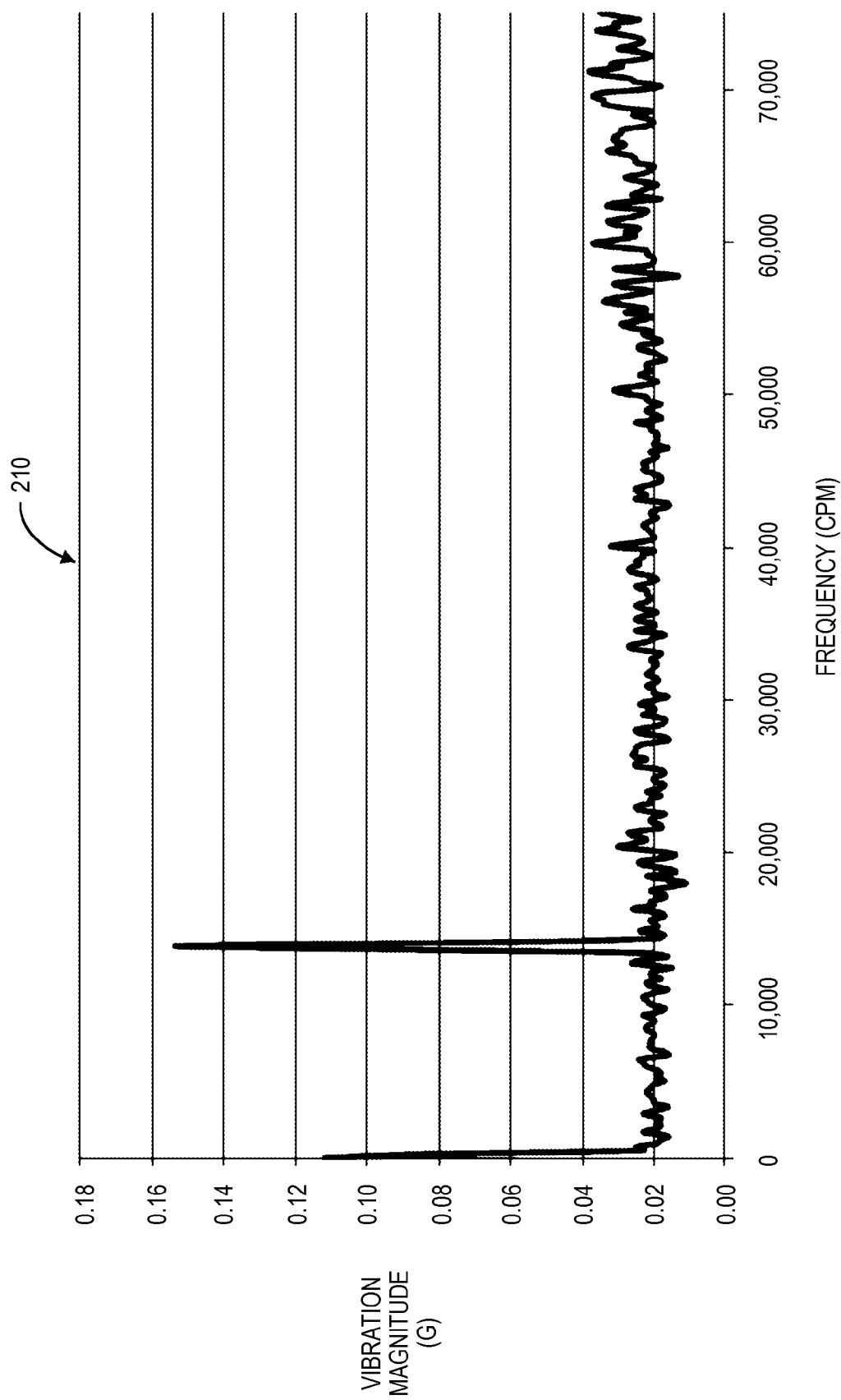
FIG. 6 is a chart of vibration data transformed into the frequency domain.

A report or chart 210 may be created from the transformed data, as shown in FIG. 6. The chart 210 may display the magnitude of vibrations along the vertical axis, and frequencies along the horizontal axis. As an example, the transformed data for a turbocharger 14 operating at 13,800 cpm is shown in FIG. 6. As can be seen, there is a spike in the value of the data at approximately the operating frequency (13,800 cpm) of the turbocharger 14, wherein the value of the data is approximately 0.15 G. If the user-specified level for excessive vibration were 0.12 G, then a turbocharger 14 rotational imbalance may be indicated. However, if the user-specified level for excessive vibration were 0.20 G, then no vibration-related malfunction may be indicated. Furthermore, in this exemplary chart 210, since there are no other spikes in the value of the transformed data, no other vibration-related malfunctions may be indicated.

Figure 7:
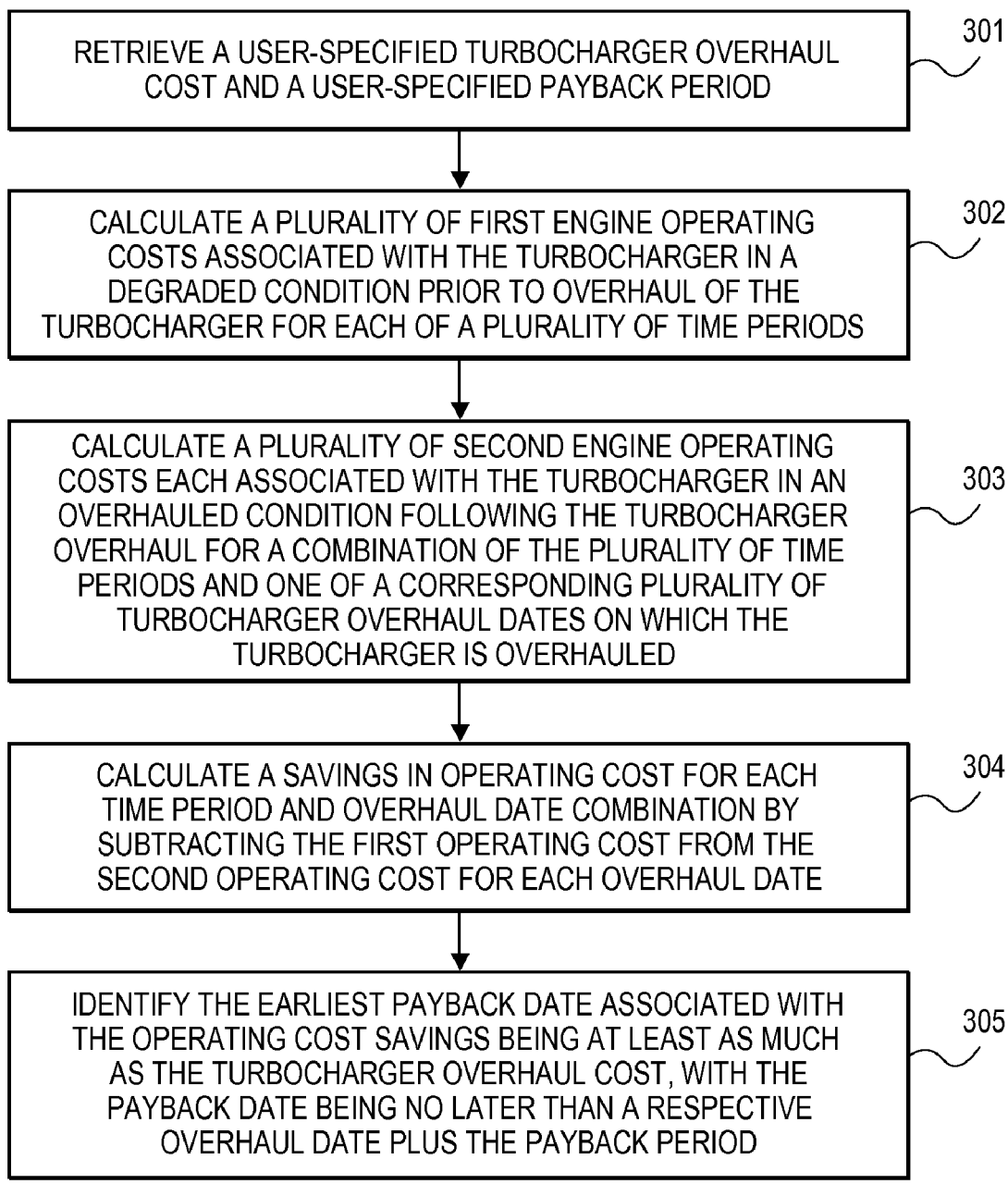
FIG. 7 is a flow diagram of at least a portion of the steps of a method for determining the earliest date to overhaul a turbocharger.

At least some of the steps of a method 300 for determining the earliest date to overhaul or replace the turbocharger of a turbocharged engine to reduce engine operating costs are listed in FIG. 7. The steps may be performed in the order as shown in FIG. 7, or they may be performed in a different order. Furthermore, some steps may be performed concurrently as opposed to sequentially. In various embodiments, the steps may correspond to one or more code segments to be executed by the computing components 22.

In connection with step 301, a user-specified cost of overhaul (or cost of replacement) and desired payback period are retrieved. The cost of the overhaul typically includes the total cost of overhauling the turbocharger 14 and may include costs for actions such as removal of the turbocharger 14, transportation, repair or replacement of parts, and reinstallation of the turbocharger 14. The payback period is the time at which the user can expect to recover the cost of the overhaul from the savings in operating costs generated by the newly overhauled turbocharger 14 which typically has a greater operating efficiency compared to the turbocharger 14 in a degraded condition prior to overhaul. The payback period may be expressed in terms of days, weeks, or months. In addition, the user may specify a period of operation of the turbocharger 14 which may represent the time period over which he is interested in operating the turbocharger 14.

In connection with step 302, a plurality of first costs 72 of operating the engine 28 associated with the turbocharger 14 in a degraded condition prior to being overhauled or replaced is calculated for each of a plurality of time periods, as shown with exemplary data in FIG. 8. Each time period may be a day, a week, or a month, and the total number of time periods may be related to the period of operation of the turbocharger 14. The first operating cost 72 may be a cumulative cost of operation over time, wherein the cost of a given time period is the sum of the costs for all the previous time periods. The first operating cost 72 may be calculated based on the physical parameters of the engine 28 such as engine horsepower and brake specific fuel consumption. The first operating cost 72 may also be based on the estimated cost of fuel and forecasted engine fuel consumption (based on forecasted waste gate margin and forecasted turbocharger efficiency). Furthermore, the first operating cost 72 preferably assumes an initial turbocharger 14 efficiency and includes a projected rate of decay in the turbocharger 14 efficiency over time.

In connection with step 303, a plurality of second costs 74 of operating the engine 28 are calculated, each associated with the turbocharger 14 in an overhauled condition (i.e., where the turbocharger is recently overhauled or replaced) for a combination of the plurality of time periods and one of a corresponding plurality of turbocharger 14 overhaul dates on which the turbocharger 14 is overhauled. The overhaul date generally occurs at the beginning of one of the time periods. The second operating cost 74 may be an array of costs and may consider the cumulative cost of operating the engine 28 if the turbocharger 14 is possibly overhauled on a plurality of different dates, as shown with exemplary data in FIG. 8. Generally, the first set 76 of second operating costs may include the cumulative operating cost for every time period if the turbocharger 14 is overhauled at the beginning of the first time period. The second set 78 of second operating costs may include the cumulative operating cost for every time period if the turbocharger 14 is overhauled at the beginning of the second time period. The calculation continues in a similar fashion for the third and subsequent time periods. Thus, there may be a second operating cost 74 for every time period and overhaul date combination, with the total number of second operating costs 74 being equal to product of the number of time periods and the number of overhaul dates.

In connection with step 304, a savings 80 in operating cost for each time period and overhaul date combination is calculated, as shown in FIG. 9 with exemplary data derived from FIG. 8, wherein the savings 80 equals the first operating cost 72 minus the second operating cost 74. Since the first operating cost 72 and the second operating cost 74 are cumulative costs, the savings 80 values are cumulative values as well, wherein the savings 80 for a given time period may be the sum of the savings 80 for all the previous time periods. The savings 80 may include an array of values generated for each set of second operating costs 74 associated with a particular overhaul date. For example, the first set 82 of savings values may equal the first operating cost 72 minus the first set 76 of second operating costs, wherein the turbocharger 14 is overhauled (or replaced) at the beginning of the first time period. Thus, the first set 82 of savings values may include a cumulative savings for each time period. The second set 84 of savings values may equal the first operating cost 72 minus the second set 78 of second operating costs, wherein the turbocharger 14 is overhauled (or replaced) at the beginning of the second time period. The second set 84 of savings values may not include a savings value for the first time period. Generally, a set of savings 80 values may not include savings 80 values prior to the overhaul date, as no savings occur until the turbocharger 14 is actually overhauled or replaced. The third and subsequent set of savings 80 values may be calculated in a similar fashion.

In connection with step 305, the earliest date corresponding to the overhaul date plus the payback period, wherein the savings 80 is equal to or greater than the cost of overhaul, is identified. Each set of savings 80 values may be scanned to determine the date. The range of savings 80 values to scan may be determined from the desired payback period. Using the data from FIG. 9 as an example, if the user specifies that payback should occur within five time periods and the cost of the overhaul is $600.00, then each set of savings values may be examined five time periods from the overhaul date. Thus, the first set 82 of savings values may be examined at time period 5. The second set 84 of savings values may be examined at time period 6, and so forth. As may be determined from FIG. 9, if the user specifies an overhaul cost of $600 and payback within five time periods, then the turbocharger 14 may be overhauled at the beginning of time period 3, wherein the savings 80 at time period 7 equals $634. Therefore, time period 3 is identified as the earliest date to recover the cost of the overhaul within five time periods.

If none of the savings values equals or exceeds the cost of overhauling the turbocharger 14 within the period of operation for the turbocharger 14, then the date of overhaul is reported as being outside of the period of operation. In such a case, the user may want to consider allowing a greater period of time for payback, or possibly a longer period of operation. While the steps associated with method 300 are preferably operable to determine the time period to overhaul the turbocharger so as to achieve a user-defined payback period (i.e., to reduce operating costs), it is also within the scope of the present invention where method 300 is used to determine when to overhaul or replace another component of the illustrated turbocharged engine. For instance, method 300 could be used to determine when to overhaul or replace aftercooler 50 (e.g., when the aftercooler exhibits excessive flow restriction).

Figure 10:
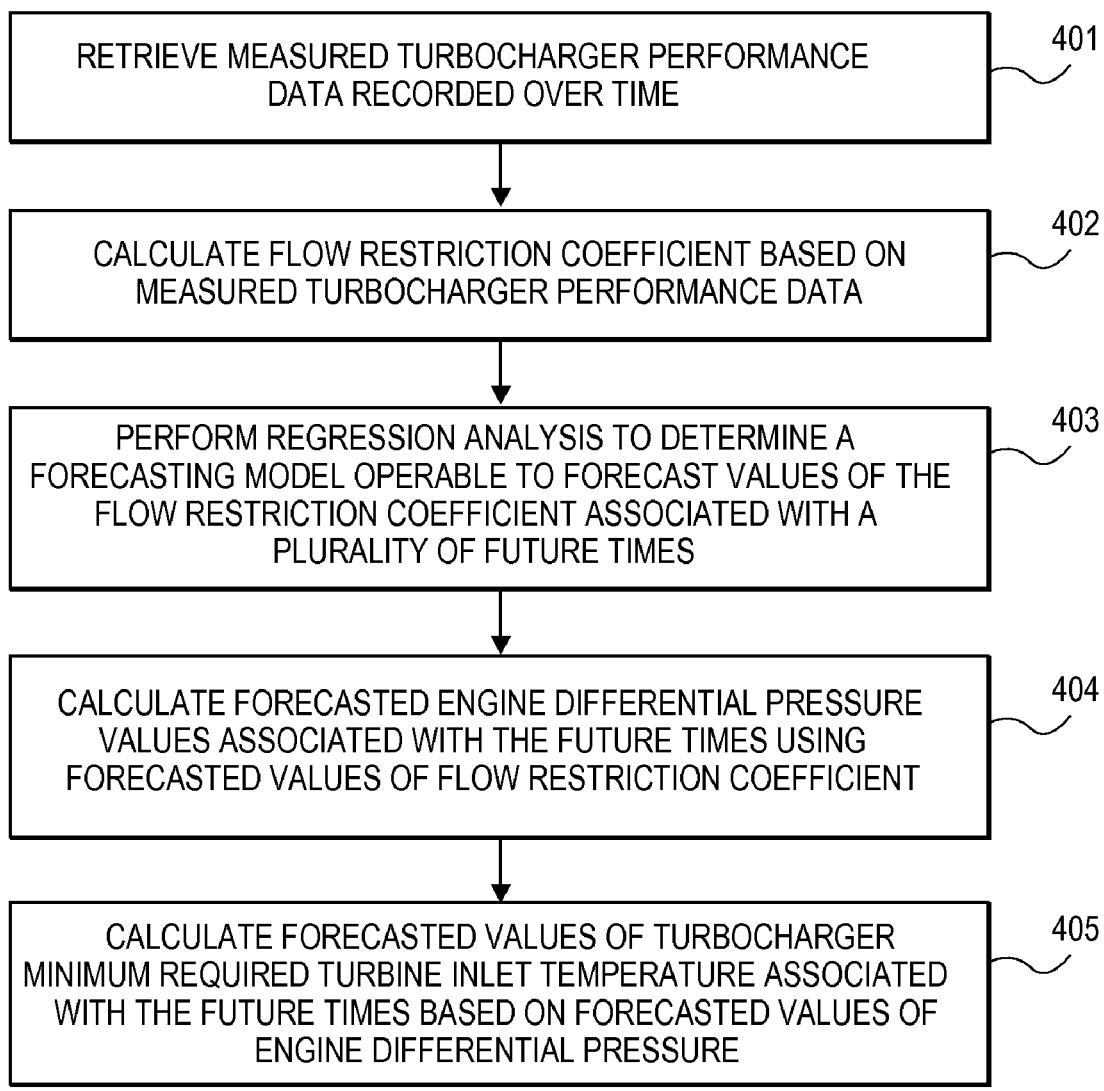
FIG. 10 is a flow diagram of at least a portion of the steps of a method for forecasting when the turbocharged engine requires service to reduce an air flow restriction.

At least a portion of the steps of a method 400 for determining when to service a turbocharged engine due to a flow restriction is listed in FIG. 10. The steps may be performed in the order as shown in FIG. 10, or they may be performed in a different order. Furthermore, some steps may be performed concurrently as opposed to sequentially. In various embodiments, the steps may correspond to one or more code segments to be executed by the computing components 22.

In connection with step 401, measured turbocharger performance data recorded over time is retrieved. In some embodiments, corrected measured data may be retrieved as well.

In connection with step 402, the flow restriction coefficient is calculated based on measured turbocharger performance data. Preferably, the flow restriction coefficient comprises an engine discharge coefficient that is determined at least partly based on the flow loss through the engine and through an aftercooler of the turbocharged engine. However, it is also within the scope of the present invention where the turbocharged engine does not include an aftercooler, or includes another component that affects the engine discharge coefficient. Engine discharge coefficient is preferably calculated according to a compressible flow relationship as a function of compressor mass flow rate and engine differential pressure.

In connection with step 403, regression analysis is performed to determine a forecasting model operable to forecast values of the flow restriction coefficient associated with a plurality of future times. Using the data calculated in step 402, the coefficient terms of a forecasting model equation such as EQ. 1 are derived so that the model may be used to forecast future values of the flow restriction coefficient.

In connection with step 404, forecasted values of engine differential pressure associated with the future times are calculated using forecasted values of the flow restriction coefficient. Preferably, the forecasted engine differential pressure is determined using the compressible flow relationship mentioned above, where the forecasted engine differential pressure is a function of forecasted compressor flow rate and forecasted flow restriction coefficient. The forecasted values of flow restriction coefficient are derived from step 403.

In connection with step 405, forecasted values of turbocharger minimum required turbine inlet temperature associated with the future times are calculated based on forecasted values of engine differential pressure (i.e., $\Delta p_{eng}$). The calculation of turbine 38 minimum required inlet temperature may rely on other values as shown in EQ. 2:

$$T_3 = \frac{T_1}{\eta_{tc}(1+FA)} \qquad \text{EQ. 2}$$

$$\frac{c_p}{c_{p,e}}\left[1-\left(\frac{p_2}{p_{amb}-\Delta p_{in}}\right)^{\phi(k_c)}\right]\left[\left(\frac{p_{amb}+\Delta p_{ex}}{p_2-\Delta p_{eng}}\right)^{\phi(k_c)}-1\right]^{-1}$$

where $T_3$ is the minimum required turbine 38 inlet temperature, $T_1$ is the compressor 34 inlet temperature, $\eta_{tc}$ is the overall turbocharger 14 efficiency, FA is a fuel-to-air ratio, $c_p$ is a specific heat of air, $c_{p,e}$ is a specific heat of exhaust from the engine 28, $p_2$ is the compressor 34 outlet pressure, $p_{amb}$ is the ambient pressure, $\Delta p_{in}$ is the difference between the ambient pressure and the compressor 34 inlet pressure, $\Delta p_{ex}$ is the difference between the turbine 38 outlet pressure and the ambient pressure, $\Delta p_{eng}$ is the difference between the compressor 34 outlet pressure and the turbine 38 inlet pressure, $\phi(k_c)$ is a function related to one or more specific heats and is equal to $(k_c-1)/k_c$ where $k=c_p/c_v$, and $\phi(k_e)$ is equal to $(k_e-1)/k_e$.

A future time may be reported when at least one of the forecasted values of the turbocharger turbine 38 minimum required inlet temperature reaches a user-specified level. It has been found that rising turbine 38 inlet temperature may be an indication of restricted exhaust flow from the engine 28. Engine flow restriction can result from a buildup of carbon or other deposits in the vicinity of the ports, such as the outlet 32, of the engine 28. At the time when the turbine 38 inlet temperature reaches the user-specified level, the buildup around the ports may be cleaned or removed to improve engine 28 performance. However, engine flow restriction may also be caused by other components of the turbocharged engine 12, e.g., by the aftercooler 50.

Figure 11:
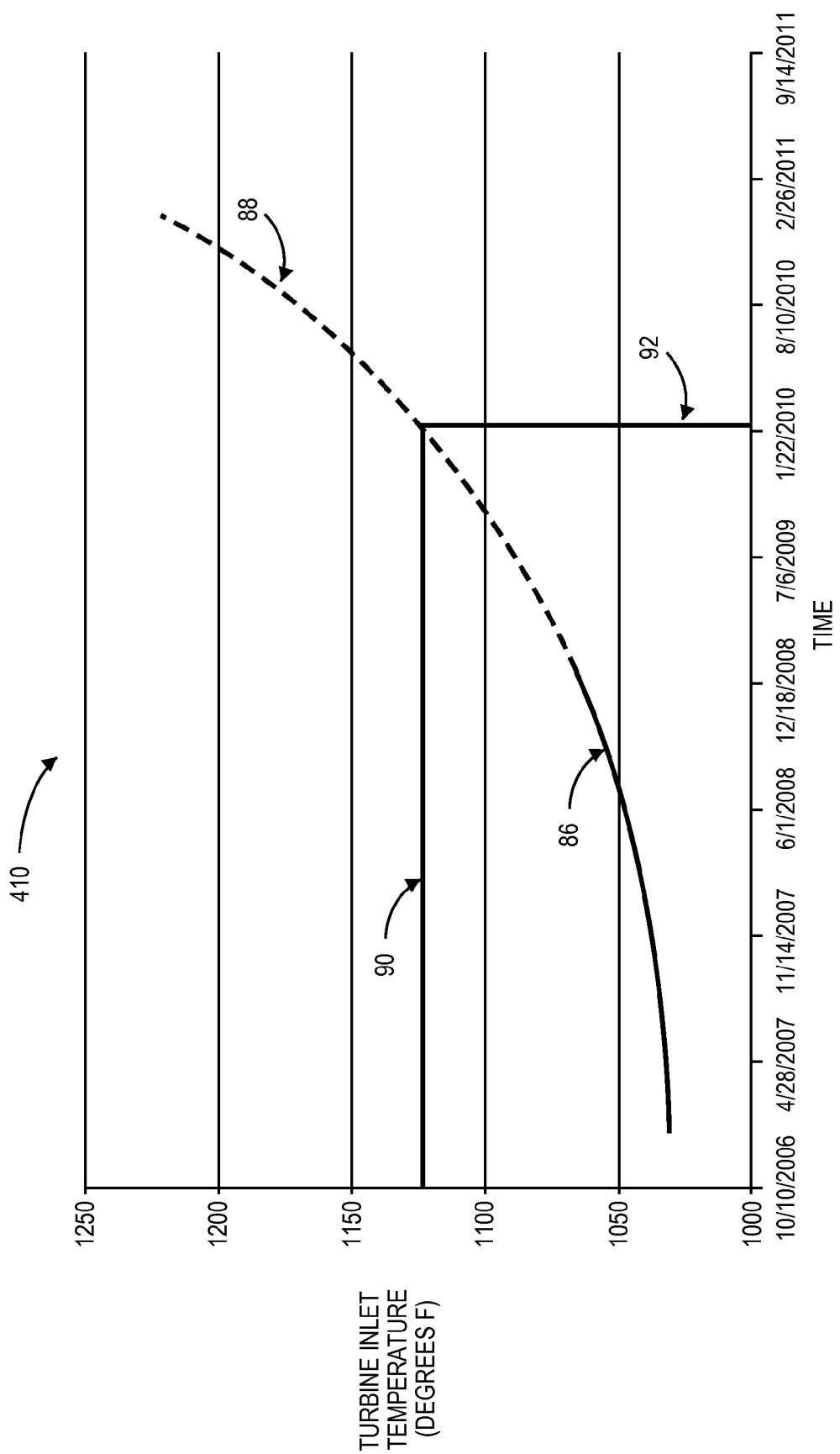
FIG. 11 is a graph of the measured and forecasted data of the minimum required turbine inlet temperature over time.

A report or graph 410 may be created from the turbine 38 inlet temperature data, as shown in FIG. 11. A first plot 86 may be created from measured and corrected data substituted into EQ. 2. A second plot 88 may be created from the forecasted values calculated in step 405. A first line 90 may be drawn to illustrate the user-specified temperature. A second line 92 may be drawn to illustrate the point in time at which the user-specified turbine 38 inlet temperature may be reached, and engine service may be required to reduce the engine discharge coefficient, e.g., by cleaning one or more engine 28 ports.

Figure 12:
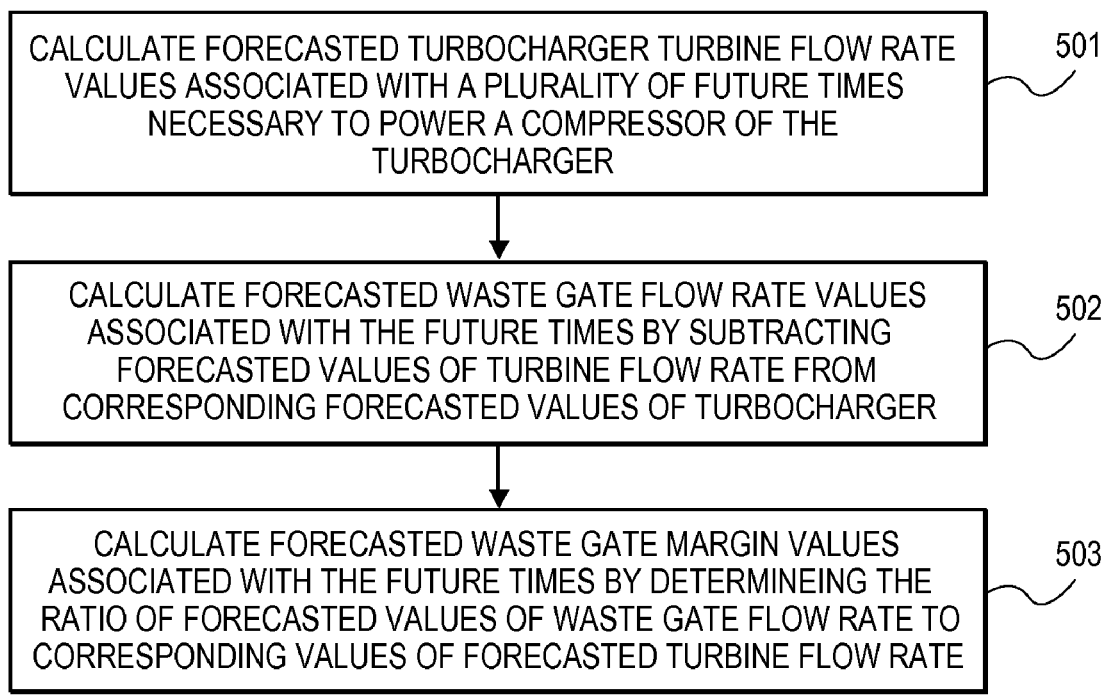
FIG. 12 is a flow diagram of at least a portion of the steps of a method for forecasting when the turbocharger requires overhauling.

At least some of the steps of a method 500 for forecasting when a turbocharger requires overhauling are listed in FIG. 12. The steps may be performed in the order as shown in FIG. 12, or they may be performed in a different order. Furthermore, some steps may be performed concurrently as opposed to sequentially. In various embodiments, the steps may correspond to one or more code segments to be executed by the computing components 22.

In connection with step 501, forecasted values of turbocharger turbine 38 flow rate associated with a plurality of future times necessary to power a compressor of the turbocharger are calculated. From the first law of thermodynamics, the compressor power is calculated as a function of compressor mass flow rate and compressor inlet and outlet temperatures. The turbine mass flow rate is then calculated according to the first law of thermodynamics after the compressor power is calculated. Engine discharge coefficient is calculated from the measured compressor mass flow rate and measured engine differential pressure according to a compressible flow relationship similar to the relationship used in step 402. Forecasted future values of engine discharge coefficient are determined by regression analysis using measured differential engine pressure. Forecasted future values of turbine inlet pressure are calculated using forecasted values of engine discharge coefficient and forecasted values of compressor mass air flow rate. Forecasted values of turbine flow rates are calculated using forecasted turbine inlet pressure and forecasted values of compressor mass air flow rate.

In connection with step 502, forecasted values of waste gate flow rate associated with the future times are calculated by subtracting forecasted values of turbine flow rate from corresponding forecasted values of turbocharger compressor flow rate. The forecasted values of turbine 38 flow rate may be derived from step 501, and the forecasted values of compressor 34 flow rate may be derived from regression analysis performed on measured and/or corrected compressor performance data.

In connection with step 503, forecasted values of waste gate margin are calculated by determining the ratio of forecasted values of waste gate flow rate to corresponding values of forecasted turbine flow rate. The waste gate flow rate may be determined from step 502, and the turbine 38 flow rate may be determined from step 501. As previously discussed, calculations similar to steps 501, 502, 503 are preferably used to calculate forecasted waste gate margin for other steps of the present invention, such as step 102. For some aspects of the present invention, alternative steps could be used to calculate forecasted waste gate margin without departing from the scope of the present invention.

A future time may be reported when at least one of the forecasted values of the waste gate margin reaches a user-specified level. Typically, as the waste gate margin diminishes, the turbocharger performance is limited according to ambient temperature. In particular, turbocharger 14 may not be able to supply the proper air flow rate to the engine 28 to meet performance criteria as ambient temperature increases. Thus, the user preferably specifies a small value for the user-specified level of waste gate margin that ranges from about zero percent to about one percent. It is also consistent with the scope of the present invention where the user-specified level of waste gate margin is determined according to another performance requirement of the turbocharged engine and/or to satisfy an emissions standard (as discussed in step 104).

Figure 13:
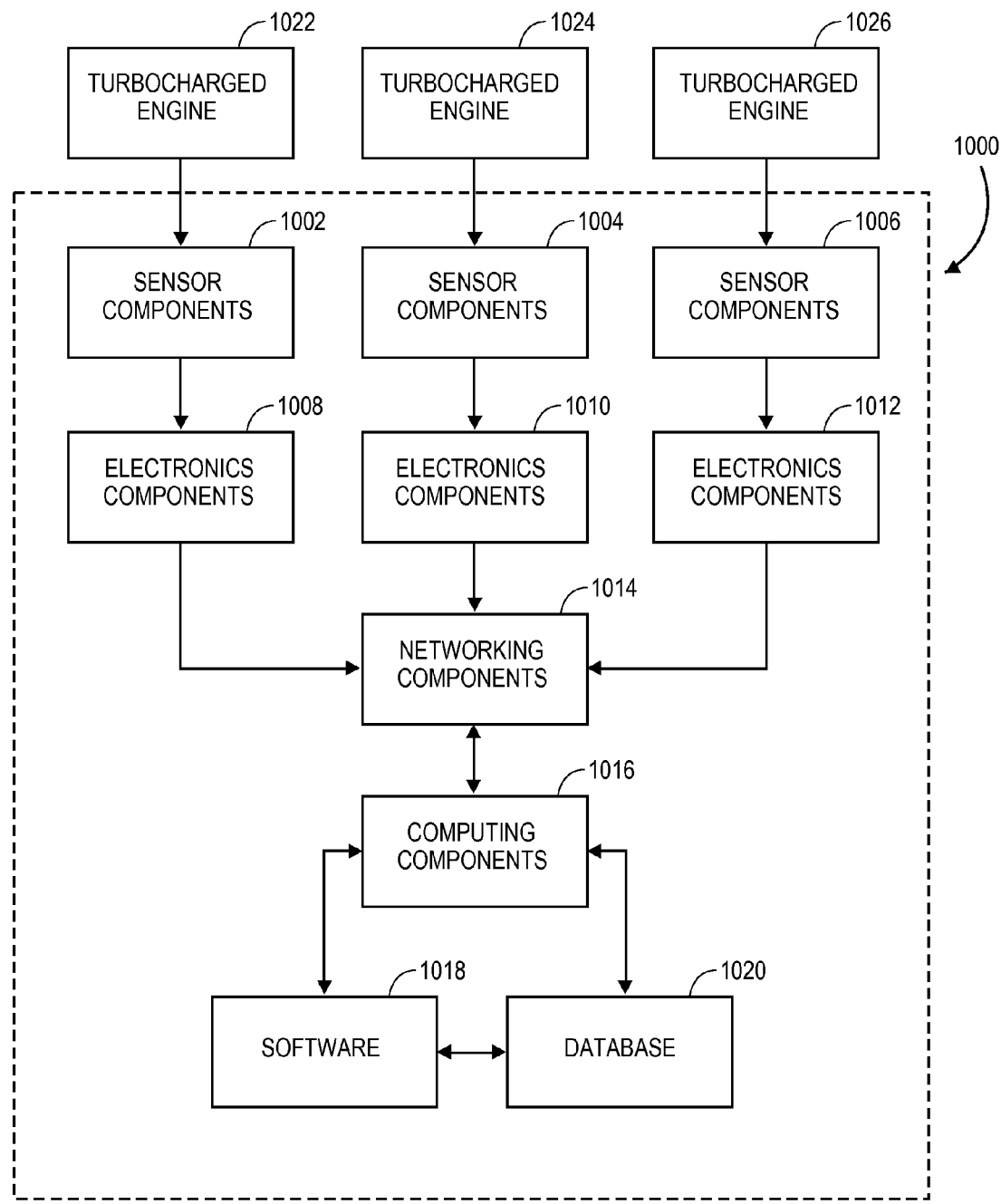
FIG. 13 is a block diagram of an alternative system operable to forecast performance and indicate malfunction of a plurality of turbocharged engines and is constructed in accordance with an alternative embodiment of the current invention.

Turning to FIG. 13, an alternative system 1000 is constructed in accordance with another preferred embodiment of the present invention. For the purpose of brevity, the following description generally discusses the differences between system 1000 and the previous embodiment. The system 1000 generally includes a plurality of sensor components 1002, 1004, 1006, a plurality of electronic components 1008, 1010, 1012, networking components 1014, computing components 1016, software 1018, and a database 1020. Sensor components 1002, 1004, 1006 are operably coupled to corresponding electronics components 1008, 1010, 1012, similar to the preferred embodiment discussed above. Furthermore, the sensor components 1002, 1004, 1006 are operably coupled to corresponding turbocharged engines 1022, 1024, 1026 similar to the preferred embodiment discussed above. In this manner, the illustrated system 1000 is operable to manage the fleet of turbocharged engines 1022, 1024, 1026. While the system 1000 is operably coupled to three engines 1022, 1024, 1026, the principles of the present invention are applicable where the system 1000 is operably coupled to and manages an alternative number of turbocharged engines.

Methods 100, 200, 300, 400, 500 are operable to be used in connection with each of the turbocharged engines 1022, 1024, 1026, similar to the preferred embodiment discussed above. Thus, method 100 is operable to forecast if each of the turbochargers of the turbocharged engines 1022, 1024, 1026 achieve a corresponding turbocharger air specification. Method 200 is operable to indicate a corresponding symptom of turbocharger malfunction for each of the turbochargers of the turbocharged engines 1022, 1024, 1026. Method 300 is operable to determine the earliest date to overhaul each of the degraded turbochargers of the turbocharged engines 1022, 1024, 1026. Method 400 is operable to determine when to service each of the turbocharged engines 1022, 1024, 1026 due to a flow restriction. Method 500 is operable to determine when to overhaul each of the turbochargers of the turbocharged engines 1022, 1024, 1026.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A physical computer-readable medium comprising a set of code segments to be executed by computing components to forecast the ability of the turbocharger to achieve a turbocharger air specification according to measured turbocharger performance data, the physical computer-readable medium comprising:
    a code segment configured to retrieve a user-specified plurality of ambient temperatures;
    a code segment configured to retrieve a user-specified plurality of future times;
    a code segment configured to determine a forecasted compressor air flow rate for each ambient temperature and future time combination by extrapolating the forecasted compressor air flow rate from the measured turbocharger performance data; and
    a code segment configured to determine whether the turbocharger satisfies the turbocharger air specification at each ambient temperature and future time combination based at least partly on the forecasted compressor air flow rate at each ambient temperature and future time combination.

2. The physical computer-readable medium of claim 1,
    wherein the turbocharger is determined as not satisfying the air specification for each ambient temperature and future time combination in which the forecasted compressor air flow rate is below a user-specified level.

3. The physical computer-readable medium of claim 1; and
    a code segment configured to determine a forecasted waste gate margin for each ambient temperature and future time combination,
    said forecasted compressor air flow rate based on the forecasted waste gate margin.

4. The physical computer-readable medium of claim 3,
    wherein the turbocharger is determined as not satisfying the air specification for each ambient temperature and future time combination in which the compressor air flow rate is above a user-specified level and the waste gate margin is below approximately one percent.

5. The physical computer-readable medium of claim 3,
    wherein the turbocharger is determined as satisfying the air specification for each ambient temperature and future time combination in which the compressor air flow rate is above a user-specified level and the waste gate margin is above approximately five percent.

6. The physical computer-readable medium of claim 3,
    wherein the turbocharger is determined as being in a condition proximal to the air specification for each ambient temperature and future time combination in which the compressor air flow rate is above a user-specified level and the waste gate margin ranges from approximately one percent to approximately five percent.

7. The physical computer-readable medium of claim 3,
    wherein the forecasted waste gate margin is determined using regression analysis.

8. The physical computer-readable medium of claim 3,
    wherein the air specification is based at least partly on the forecasted waste gate margin.

9. The physical computer-readable medium of claim 1; and
    a code segment configured to create a graph displaying each ambient temperature and future time combination wherein each ambient temperature and future time combination is assigned an indicia based on whether the turbocharger is determined as satisfying the air specification.

10. The physical computer-readable medium of claim 9,
    wherein each ambient temperature and future time combination is assigned a first indicia if the turbocharger is determined as satisfying the air specification, a second indicia if the turbocharger is determined as being in a condition proximal to the air specification, and a third indicia if the turbocharger is determined as not satisfying the air specification.

11. The physical computer-readable medium of claim 1, wherein the code segments are operable to forecast if a plurality of turbochargers achieve a corresponding turbocharger air specification.

12. A physical computer-readable medium comprising a set of code segments to be executed by computing components to determine the earliest date to overhaul the degraded turbocharger of a turbocharged engine to reduce engine operating cost, the physical computer-readable medium comprising:
   a code segment configured to retrieve a user-specified turbocharger overhaul cost and a user-specified payback period;
   a code segment configured to calculate a plurality of first engine operating costs associated with the turbocharger in a degraded condition prior to overhaul of the turbocharger for each of a plurality of time periods;
   a code segment configured to calculate a plurality of second engine operating costs each associated with the turbocharger in an overhauled condition following the turbocharger overhaul for a combination of the plurality of time periods and one of a corresponding plurality of turbocharger overhaul dates on which the turbocharger is overhauled;
   a code segment configured to calculate a savings in operating cost for each time period and overhaul date combination by subtracting the first operating cost from the second operating cost for each overhaul date; and
   a code segment configured to identify the earliest payback date associated with the operating cost savings being at least as much as the turbocharger overhaul cost, with the payback date being no later than a respective overhaul date plus the payback period.

13. The physical computer-readable medium of claim 12; and
   a code segment configured to notify a user if the earliest payback date corresponding to the overhaul date plus the payback period wherein the savings is equal to or greater than the cost of overhaul occurs outside of a user-specified period of turbocharger operation.

14. The physical computer-readable medium of claim 12, wherein the first operating cost and the second operating cost are calculated at least partly based on a physical parameter of the engine, the cost of fuel, and a forecasted turbocharger efficiency.

15. The physical computer-readable medium of claim 12, wherein the turbocharger overhaul cost includes the cost of removing and reinstalling the turbocharger.

16. The physical computer-readable medium of claim 12, wherein at least one of the first operating costs and the second operating costs is calculated by forecasting the engine fuel consumption.

17. The physical computer-readable medium of claim 16, wherein the engine fuel consumption is calculated based on at least partly the turbocharger efficiency.

18. The physical computer-readable medium of claim 12, wherein the first operating costs and the second operating costs are cumulative costs, such that the cost at any given time period is the sum of the costs for all previous time periods.

19. The physical computer-readable medium of claim 12, wherein the savings is a cumulative savings, such that the savings at any given time period is the sum of the savings for all previous time periods.

20. The physical computer-readable medium of claim 12, wherein the code segments are operable for a plurality of degraded turbochargers to determine the earliest date to overhaul each of the degraded turbochargers.

21. A physical computer-readable medium comprising a set of code segments to be executed by computing components to determine when to service a turbocharged engine due to a flow restriction, the physical computer-readable medium comprising:
   a code segment configured to retrieve measured turbocharger performance data recorded over time;
   a code segment configured to calculate flow restriction coefficient based on measured turbocharger performance data;
   a code segment configured to perform regression analysis to determine a forecasting model operable to forecast values of the flow restriction coefficient associated with a plurality of future times;
   a code segment configured to calculate forecasted engine differential pressure values associated with the future times using forecasted values of flow restriction coefficient; and
   a code segment configured to calculate forecasted values of turbocharger minimum required turbine inlet temperature associated with the future times based on forecasted values of engine differential pressure.

22. The physical computer-readable medium of claim 21; and
   a code segment configured to report at least one of the future times when at least one of the forecasted values of the turbocharger minimum required turbine inlet temperature reaches a user-specified level.

23. The physical computer-readable medium of claim 21, wherein the calculation of forecasted engine differential pressure values is at least partly based on forecasted values of a turbocharger compressor mass air flow rate.

24. The physical computer-readable medium of claim 21, wherein the calculation of forecasted values of turbocharger minimum required turbine inlet temperature is further based on a turbocharger compressor inlet temperature, an ambient pressure, and a turbocharger efficiency.

25. The physical computer-readable medium of claim 21, wherein the calculation of flow restriction coefficient is at least partly based on the flow loss through an aftercooler of the turbocharged engine.

26. The physical computer-readable medium of claim 21, wherein the forecasting model includes an exponential model.

27. The physical computer-readable medium of claim 21, wherein the code segments are operable for a plurality of turbocharged engines to determine when to service each of the turbocharged engines due to a flow restriction.

28. A physical computer-readable medium comprising a set of code segments to be executed by computing components to determine when to overhaul a turbocharger, the physical computer-readable medium comprising:
- a code segment configured to calculate forecasted turbocharger turbine flow rate values associated with a plurality of future times necessary to power a compressor of the turbocharger;
- a code segment configured to calculate forecasted waste gate flow rate values associated with the future times by subtracting forecasted values of turbine flow rate from corresponding forecasted values of turbocharger compressor flow rate; and
- a code segment configured to calculate forecasted waste gate margin values associated with the future times by determining the ratio of forecasted values of waste gate flow rate to corresponding values of forecasted turbine flow rate.

29. The physical computer-readable medium of claim 28; and
- a code segment configured to report the future time when at least one of the forecasted values of the waste gate margin reaches a user-specified level.

30. The physical computer-readable medium of claim 28, wherein the calculation of the forecasted turbocharger turbine flow rate is based on forecasted values of engine discharge coefficient.

31. The physical computer-readable medium of claim 30, wherein the forecasted values of engine discharge coefficient are extrapolated from measured turbocharger performance data recorded over time.

32. The physical computer-readable medium of claim 28, wherein the code segments are operable for a plurality of turbochargers to determine when to overhaul each of the turbochargers.

* * * * *